United States Patent Office 3,712,942
Patented Jan. 23, 1973

3,712,942
METHOD OF PRODUCING VANADIUM COMPOUNDS BY ALKALINE LEACHING
Zdeněk Švejda, Prague, Czechoslovakia, assignor to Vyzkumny ustav Kovu, Panenske Brezany, Czechoslovakia
No Drawing. Filed May 29, 1968, Ser. No. 732,834
Int. Cl. C10g 31/00; C22b 3/00, 55/00
U.S. Cl. 423—593                                    5 Claims

ABSTRACT OF THE DISCLOSURE

Vanadium compounds are produced from ores by adding sodium hydroxide or potassium hydroxide to finely ground raw material which contains $V_2O_3$ or another insoluble form of vanadium, the concentration of the sodium hydroxide or potassium hydroxide being in the range of 250 to 400 g./l. $Na_2O$ or $K_2O$, wherein the reaction mixture is heated to a temperature of at least 250° and oxygen or compressed air is added to oxidize the $V_2O_3$ to $V_2O_5$, and then filtering the solution so as to separate the crystalline alkaline vanadate formed. In addition, prior to the crystallization soluble fluorides or phosphates may be added to the solution so as to further increase the crystallization.

---

This invention relates to a method of producing vanadium compounds by alkaline leaching.

According to known methods of operation, vanadium compounds, particularly $V_2O_5$, are produced from ores by calcination with oxidation of the raw material by the addition of NaCl, $Na_2SO_4$ and the like, in a suitable furnace utilizing a temperature of about 1000° C. The raw material consists of ores or of so-called vanadium slag which contains trivalent vanadium in insoluble form, mostly bound to oxides of the type RO in spinel-bond. Since this bond is very stable, its decomposition requires the application of a very high temperature during the heating step. In addition, the oxidation reaction, in solid or semi-liquid form, of this charge with its heterogeneous character, takes a slow course, the vanadium yield amounting to more than 70-80% and the escaping gas containing harmful substances, particularly $Cl_2$ and HCl. Further disadvantages are the low thermal efficiency of the furnace, the production of diluted vanadate solutions and the insufficient purity of the obtained $V_2O_5$ since only 90-95% is recovered at the first precipitation, thereby requiring an additional refinement which complicates the process.

The present invention is an improvement over these prior known methods and eliminates the drawbacks therein. According to the present invention, finely ground raw material which contains $V_2O_3$ or some other insoluble form of vanadium is utilized and a solution of sodium hydroxide or potassium hydroxide is added to it in a concentration of 250-400 g. per liter of $Na_2O$ or $K_2O$. Utilizing a pressure pump the obtained reduction mixture is pumped into a through-flow autoclave where it is heated to a temperature of at least 250°, preferably to 320-340° C. At the same time, gaseous oxygen or air is passed into the solution, a higher pressure being utilized with air due to its smaller oxygen content. A pressure of 120-180 kp./cm.² is required according to the temperature used and to the resistance of the autoclave. An oxidation of the insoluble $V_2O_3$ to $V_2O_5$ takes place. The $V_2O_5$ is soluble in the solution and enters the solution in the form of $Na_3VO_4$. The solution is then cooled to a temperature of below 30° C., preferably to 5-10° C. with the accompanying separation of pure crystalline $Na_3VO_4 \cdot 8-12H_2O$. Only about 1 to 2 g./l. of $V_2O_5$ remain in the mother liquor. This percentage can be further reduced by the addition of fluorine salts or phosphates such as NaF, $Na_3PO_4$ or the like. Continued crystallization reduces the $V_2O_5$ content in the mother liquor to 0.5 to 1 g./l. $Al_2O_3$ and the like is dissolved during the leaching action. Prior to crystallization, these substances can be precipitated by lime and filtered out. By crystallizing out the vanadates, and thereafter thickening the liquor, it can again be used for the treatment of raw materials. From the $Na_3VO_4$ obtained, $V_2O_5$ can be produced in the usual way by acidifying the salt after dissolving it in water, filtering out the vanadium acid and remelting the substance.

Thus, the present invention relates to a method of obtaining vanadium compounds by adding sodium hydroxide or potassium hydroxide to finely ground raw material which contains $V_2O_3$ or some other insoluble form of vanadium, the concentration of the NaOH or KOH being 250 to 400 g./l. $Na_2O$ or $K_2O$, preferably 320 to 350 g./l., by heating the reaction mixture to a temperature of at least 250° C., preferably 320-340° C., and then oxidizing with oxygen or compressed air and thereupon filtering the solution and cooling it down to a temperature below 30° C., preferably 5-10° C., so as to separate the crystalline alkaline vanadate. The $V_2O_5$ content in the mother solution is further reduced by the addition of soluble fluorides or phosphates by which the crystallization effect is increased.

Example 1

One ton of vanadium slag is used. After the elimination of iron, the vanadium slag is mixed with the addition of 8 to 100 m.³ of a solution which contains 300-350 g./l. of $Na_2O$ (in the form of NaOH). Using a pressure of 150 kp./cm.², the reaction mixture is transferred into a tube-autoclave fitted with a heat exchanger where it is progressively heated to 340° C. Simultaneously, an excess quantity of compressed oxygen is driven in, the oxygen together with any air therein being later separated using a tower-type separator. After the heating step and cooling it down to about 100° C., the solid residue is filtered out and washed by means of vacuum filters. The solution containing 10–20 g./l. $V_2O_5$, 20–30 g./l. $SiO_2$ and 10 g./l. $Al_2O_3$, is precipitated, in a mixer, by fresh lime. The calcium silicate and calcium aluminate obtained is filtered out and washed. These can be secondary products. In a through-flow crystallizer, the residual solution is cooled down to 10° C. whereby crystalline

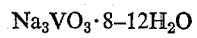

$$Na_3VO_3 \cdot 8-12H_2O$$

is separated. After the filtration of this product, vanadium salts or $V_2O_5$ are produced in the usual manner.

The mother solution, having a content of 1 g./l. $V_2O_5$, is evaporated to a concentration of 550–600 g./l. $Na_2O$. By further cooling it down to 10–20° C., the remaining impurities are eliminated and filtered. The mother solution may also be cooled down to $-10°$ C., without preliminary evaporation. In this way the impurities are also separated. Then, the mother solution can again be used for the preparation of the charge.

It will be obvious to those skilled in the art that various changes may be made without departing from the scope of the invention and the invention is not to be considered limited to what is described in the specification.

What is claimed is:

1. A method of producing vanadium compounds from finely ground raw material which contains $V_2O_3$ or some other insoluble form of vanadium which comprises adding NaOH or KOH being 250–400 g./l. $Na_2O$ or $K_2O$, heating the reaction mixture to a temperature of between about 320–340° C., supplying oxygen or compressed air at a pressure exceeding 120 atmospheres and oxidizing said reaction mixture solution, filtering the solution, cooling the resultant to a temperature below 30° C., adding a sodium fluoride to said cooled solution and precipitating a crystalline alkaline vanadate, and finally filtering out the precipitate.

2. A method in accordance with claim 1 wherein the concentration of NaOH or KOH is between 320–350 g./l.

3. A method in accordance with claim 1 wherein the reaction mixture is heated to a temperature of 320–340° C.

4. A process in accordance with claim 1 wherein the solution is cooled to a temperature of 5–10° C.

5. A method in accordance with claim 1 wherein the concentration of NaOH or KOH is 320–350 g./l., the reaction mixture is heated to a temperature of 320–340° C. and the solution is cooled to a temperature of 5–10° C.

References Cited

UNITED STATES PATENTS

| | | | |
|---|---|---|---|
| 1,765,870 | 6/1930 | Jaeger et al. | 23—19 V |
| 2,298,091 | 10/1942 | Cooper, Jr., et al. | 23—19 V |
| 3,061,407 | 10/1962 | Burkin et al. | 23—18 |
| 3,429,693 | 2/1969 | Bauer et al. | 23—18 X |

FOREIGN PATENTS

| | | | |
|---|---|---|---|
| 451,981 | 8/1936 | Great Britain | 23—19 V |

MILTON WEISSMAN, Primary Examiner

U.S. Cl. X.R.

23—19 V; 423—68, 593